UNITED STATES PATENT OFFICE.

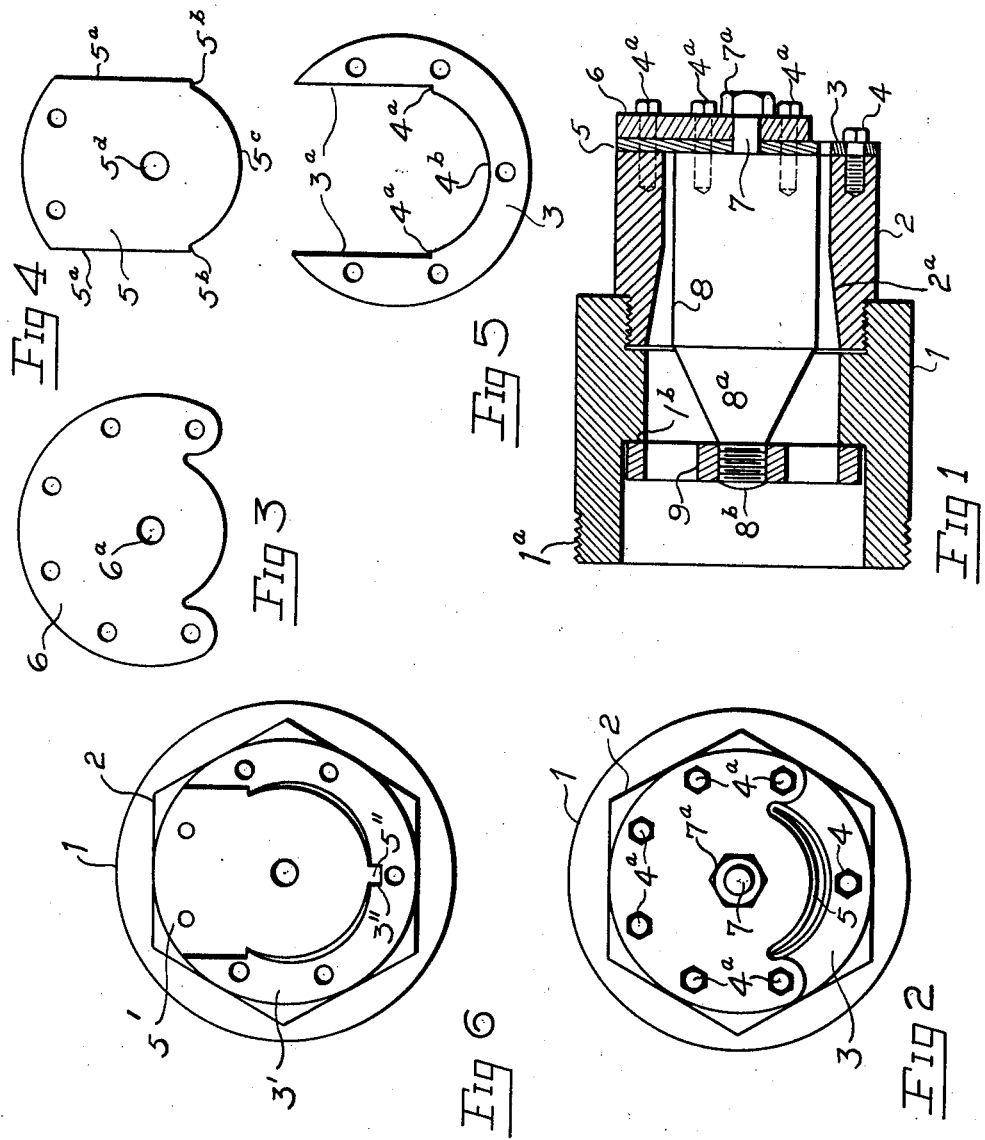
E. D. VALENTINE.
DIE FOR MAKING PNEUMATIC TIRE TREADS.
APPLICATION FILED AUG. 20, 1919.
1,333,047.
Patented Mar. 9, 1920.

ERNEST D. VALENTINE, OF SPRINGFIELD, OHIO.

DIE FOR MAKING PNEUMATIC-TIRE TREADS.

1,333,047.    Specification of Letters Patent.    Patented Mar. 9, 1920.

Application filed August 20, 1919. Serial No. 318,666.

*To all whom it may concern:*

Be it known that I, ERNEST D. VALENTINE, a citizen of the United States, residing at Springfield, in the county of Clark and State of Ohio, have invented certain new and useful Improvements in Dies for Making Pneumatic-Tire Treads, of which the following is a specification.

My invention relates to improvements in machines for making the rubber tread portions of pneumatic tire casings, it more particularly relating to the construction and arrangement of the die for such machines.

An object of my invention is to provide an arrangement in which the dies may be readily changed from one size to another with a minimum change of associated parts.

A further object of my invention is to provide an arrangement in which the pressure of the material upon the dies is reduced to the minimum so as to relieve the dies and their connecting supports from undue strain.

A further object of my invention is to provide a die of the character referred to which will be simple in construction, effective in its operation and economical in that it permits the employment of parts which may be used with and be common to any of the different sizes of dies.

In the accompanying drawings:—

Figure 1 is a longitudinal section of a die and its associated parts embodying my improvements.

Fig. 2 is an end view of the same.

Fig. 3 is a view of the die supporting clamping plate.

Fig. 4 is a view of one of the die plates.

Fig. 5 is a view of the companion die plate.

Fig. 6 is an end view of the construction with the clamping plate removed showing a modification in the form of the die plates.

The construction which I have shown in the drawings is in the nature of an attachment to a tube machine (not shown). The cylindrical head 1 has its rear end provided with outer screwthreads $1^a$ by which it may be screwed into the threaded forward end of the cylinder of the tube machine, the material which has been fed into the tube machine being forced into the head 1 by the usual screw conveyer employed in such machines. The forward end of the head 1 is interiorly threaded to receive the threads formed on the rear end of an auxiliary head or chamber 2. Secured to the forward end of the auxiliary head 2 are die plates, 3 and 5, and a supporting and clamping plate 6; the screw bolt 4 passing through the lower portion of the plate 3, while the screw bolts $4^a$ pass through the clamping plate 6 and, respectively, through the die plates 3 and 5 into the head 2.

The die plate 3 is of a substantially U-shaped form having interior straight walls $3^a$ terminating in shoulders $4^a$ and a lower wall $4^b$ formed on the arc of a circle. The die plate 5 also has straight vertical outer walls $5^a$ which terminate in lower shoulders $5^b$, and a lower wall $5^c$ also formed upon the arc of a circle, so that when the two plates are together with the respective shoulders abutting a crescent-shaped opening will be formed through the plates of a size and shape to give the required form to the tire tread.

The rear end of the bore in the head 1 is enlarged to receive a spider 9, the hub of which is threaded to receive the threaded rear end of a mandrel 8, the forward end of which has a central forwardly projecting stud 7 which extends through an opening $5^d$ in the die plate 5 and also an opening $6^a$ in the clamping plate 6, the outer end being threaded to receive the clamping nut $7^a$, which when tightened draws the spider 9 against the shoulder $1^b$ formed on the interior of the head 1 so as to firmly center the mandrel in position and form a brace for the clamping plate 6 which provides a reinforcement for the die plates.

The main body of the mandrel is of such size as to leave a space in the forward end of the auxiliary head 2 substantially equal to the greatest width of the slot formed by the die plates; the inner bore of the auxiliary head 2 being tapered outwardly and rearwardly as indicated at $2^a$ so as to form a converging forwardly-extending passageway, and the rear end of the mandrel being formed with a cone-shaped portion $8^a$ which terminates in the threaded stub $8^b$ which secures it to the spider.

In the event that it is desired to change the die plates for larger or smaller ones, this may be readily accomplished by removing the nut $7^a$ and then unscrewing the auxiliary head 2 from the head 1, after which a new auxiliary head with die plates of different sizes secured thereto may be threaded to the main head 1 and the clamping nut 7ª again threaded upon the stud 7. By this arrangement it will be seen that the same head 1, spider 9 and mandrel 8 will answer the purpose for all dies thus effecting a material saving in the number of parts necessary to make the change in the size of the die; and further, by having auxiliary heads already with die plates in proper adjusted position thereon no change in adjustment of the size of the die opening is necessary, thus insuring a uniform tread for all tires of the same size, something which is very essential and which requires considerable experimenting to accomplish with dies of the adjustable type.

Also, by this construction, undue pressure of the material upon the die plates, which would result in a breakage of the parts, is obviated. It will be understood that the material, as it comes from the screw conveyer, is forced through the heads at a great pressure, the action of the screw conveyer serving to keep the material rotating in the heads. By having the mandrel arranged as described, the material is prevented from exerting any pressure against the die plates excepting on the comparatively small surface thereof which coincides with the passageway between the mandrel and the inner bore of the auxiliary head 2.

In Fig. 6 there is shown a modification by which two tire treads may be formed simultaneously by the same machine. The die plates 3' and 5' are shouldered and fitted together in the manner described in connection with the plates 3 and 5, but in this modification the plate 5' has a centrally arranged projecting lug 5'' at its lower end fitted in a recess 3'' in the die plate 3'. Between the respective shoulders and this lug and recess the plates are formed on arcs of circles so as to provide two crescent-shaped openings so two tire treads may be tubed at the same time. The arrangement of the mandrel and the manner of securing these plates in position are the same as described in connection with the construction shown in the other figures.

Having thus described my invention, I claim:—

1. In a device of the character described, a head formed with a cylindrical bore, one end of said head having a wall provided with a die opening, and a mandrel secured in the bore of said head in non-adjustable relation with said opening, said mandrel cooperating with the cylindrical wall of said head to form a passageway for the material leading to said opening and serving to prevent the pressure of said material upon the major portion of the said end wall.

2. In a device of the character described, a head formed with a cylindrical bore, one end of said head having a wall provided with a die opening, a mandrel located in but spaced apart from the cylindrical wall of said head, one end of said mandrel being non-adjustably supported by said end wall, and a support located in the opposite end of said head for rigidly supporting the other end of said mandrel, the space between said mandrel and head forming a passageway leading to said die opening.

3. In a device of the character described, a head formed with a cylindrical bore, one end of said head having a wall provided with a die opening, a mandrel located in but spaced apart from the inner wall of said head, one end of said mandrel being rigidly clamped to the end wall of said head, and a support located in the opposite end of said head and immovable toward said wall when in working position to which the other end of said mandrel is rigidly secured.

4. In a device of the character described, a head formed with a cylindrical bore, one end of said head having a wall provided with a die opening, a spider located against a fixed abutment in said head, a mandrel located in said head but spaced apart from the inner walls thereof to form a passageway leading to said die opening, one end of said mandrel being fixed to said spider, and means for clamping the opposite end of said mandrel to said end wall.

5. In a device of the character described, a head formed with a cylindrical bore, said head being constructed of two parts removably secured together, one of said head parts having an end wall provided with a die opening, a mandrel located in said head but spaced apart from the inner wall thereof to provide a passageway leading to said die opening, means for removably clamping one end of said mandrel to said end wall, and means for supporting the opposite end of said mandrel.

6. In a device of the character described, a head formed with a cylindrical bore, said head being constructed of two parts removably secured together, one of said parts having an end wall provided with a die opening, a mandrel located in said head but spaced apart from the inner wall thereof to provide a passageway leading to said die opening, means for removably clamping one end of said mandrel to said end wall, and a spider for supporting the opposite end of said mandrel and arranged to be drawn against a fixed abutment in said head by said clamping means.

7. In a device of the character described, a head formed with a cylindrical bore, a pair of die plates secured to one end of said head and coöperating with each other to form a die opening, a mandrel in said head spaced apart from the inner wall thereof to provide a passageway leading to said die opening, means for rigidly supporting one end of said mandrel, and means for clamping the opposite end of said mandrel to said die plates in fixed relation with said die opening.

8. In a device of the character described, a head provided with a cylindrical bore, a mandrel located in said head of smaller diameter than the bore thereof, a pair of die plates and a reinforcing plate for the same secured to one end of said head, said die plates coöperating with each other to form a die opening which communicates with a space between said mandrel and the inner wall of said head, a support to which one end of said mandrel is secured, said support being immovable when in working position toward said die plates, and a stud on the opposite end of said mandrel extending through said plates and threaded to receive a nut.

9. In a device of the character described, a head formed with a cylindrical bore, an end wall for said head provided with a plurality of die openings, a mandrel located in said head but spaced apart from the inner wall thereof to provide a passageway leading to said die openings, and means for securing said mandrel in non-adjustable fixed relation to said openings.

In testimony whereof I have hereunto set my hand this 2nd day of July, 1919.

ERNEST D. VALENTINE.

Witness:
  CHAS. I. WELCH.